(12) United States Patent
Azoulay

(10) Patent No.: US 8,516,742 B1
(45) Date of Patent: Aug. 27, 2013

(54) AUTOMATIC HYDROPONIC CLONING SYSTEM

(76) Inventor: Sidney S. Azoulay, Pahrump, NV (US)

( * ) Notice: Subject to any disclaimer, the term of this patent is extended or adjusted under 35 U.S.C. 154(b) by 999 days.

(21) Appl. No.: 11/490,919

(22) Filed: Jul. 21, 2006

Related U.S. Application Data

(60) Provisional application No. 60/701,291, filed on Jul. 21, 2005.

(51) Int. Cl.
  *A01G 31/00* (2006.01)
(52) U.S. Cl.
  USPC ............................................. 47/62 A
(58) Field of Classification Search
  USPC ............ 47/62 R, 62 A, 59 R, 62 C, 62 E, 47/62 N, 63, 64, 79; 239/215, 222, 222.11, 239/223, 224, 498, 504, 524
  See application file for complete search history.

(56) References Cited

U.S. PATENT DOCUMENTS

| | | | | |
|---|---|---|---|---|
| 2,815,246 A | * | 12/1957 | Nyrop | ............................ 239/223 |
| 4,144,671 A | | 3/1979 | Lee | |
| 4,976,064 A | * | 12/1990 | Julien | ................................ 47/63 |
| 4,989,367 A | | 2/1991 | Chung | |
| 5,025,589 A | | 6/1991 | Park | |
| 5,607,627 A | * | 3/1997 | Berkeley et al. | ................. 261/91 |
| 6,442,892 B1 | * | 9/2002 | Azoulay | ............................ 47/61 |

* cited by examiner

*Primary Examiner* — Timothy D Collins
*Assistant Examiner* — Michael Kreiner
(74) *Attorney, Agent, or Firm* — Raj Abhyanker, P.C.

(57) ABSTRACT

An automatic cloning apparatus is disclosed which comprises a housing having an interior divided into a plant compartment and a water compartment. The plant compartment has a plurality of porous net pockets adapted to allow plants to rest thereon and water to drain therethrough. Above the water compartment is a mixing area having a mist generator thereon. The mist generator is mounted to the housing and has a motor with a hollow tapered shaft extending downwardly therefrom into the water compartment. The shaft is tapered whereby when spinning rapidly, the combination of centripetal force on the water and the outwardly sloping inner surface of the tapered shaft forces water upwardly therein. A disk is mounted atop the open upper end of the tapered shaft and adapted to receive water therefrom. The disk throws the water off in a radial movement in small droplets in the mixing area and also forces air within the mixing area outwardly throughout the mixing area. This action mixes the air and the water within the mixing area and forces the resultant mixture through the cage to the plant compartment in a fine mist.

18 Claims, 4 Drawing Sheets

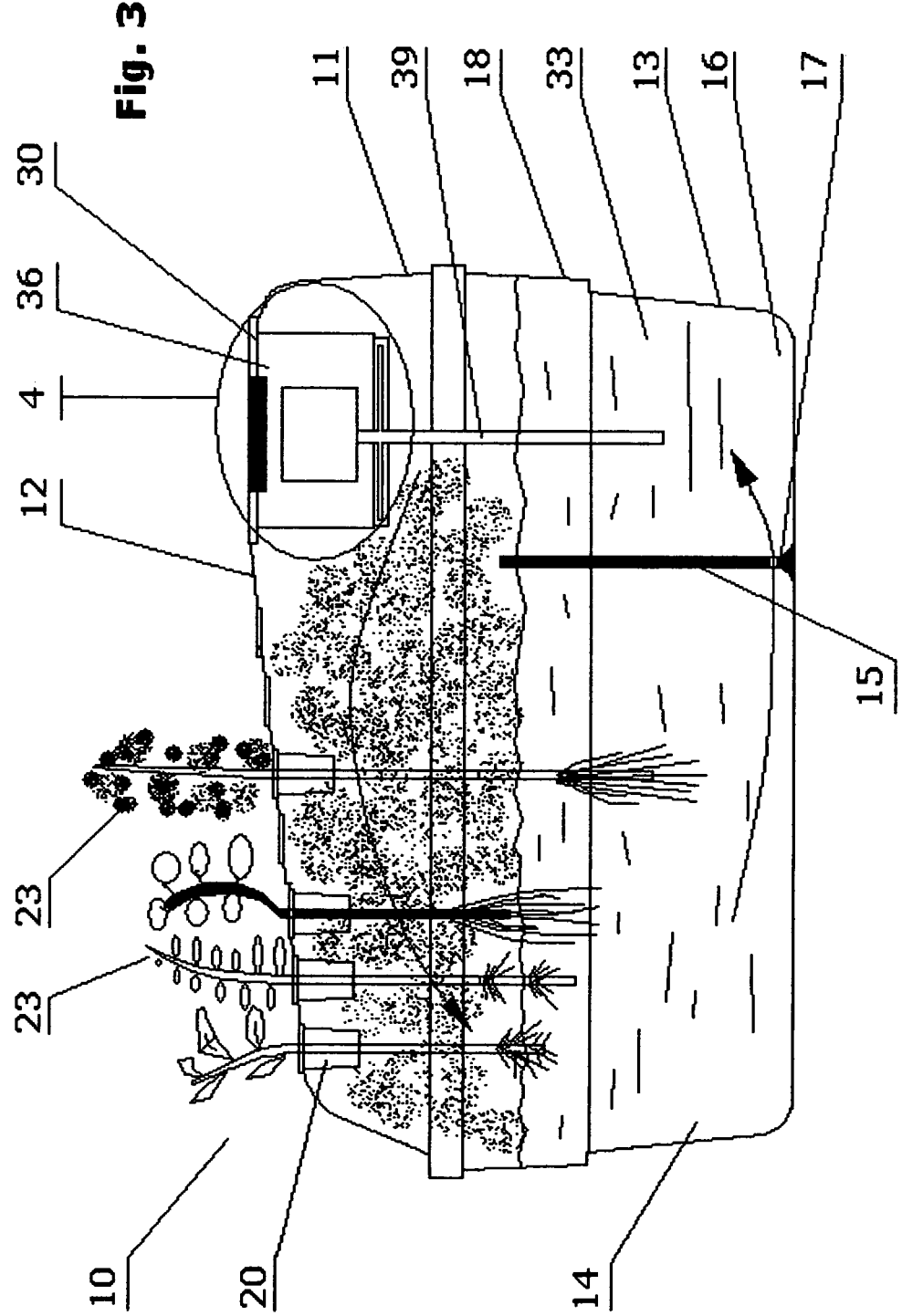

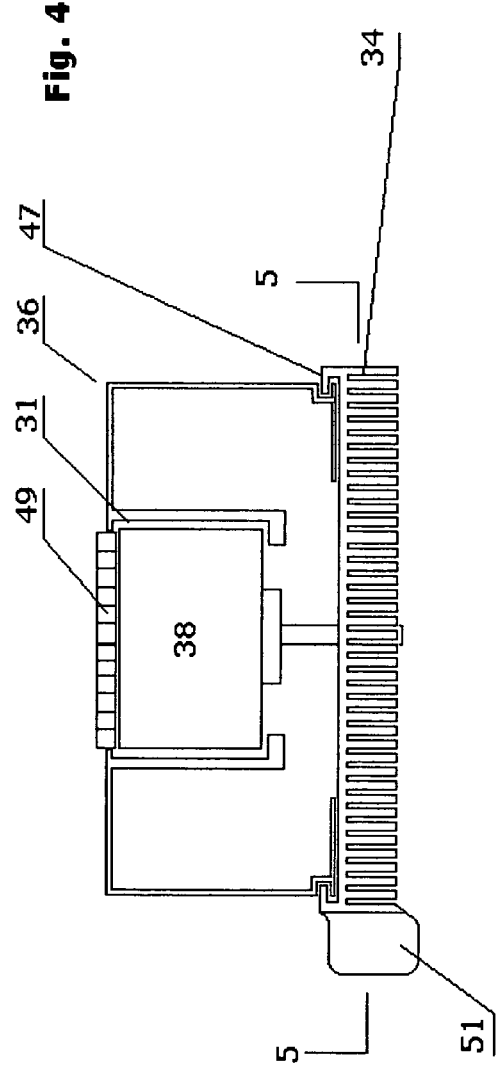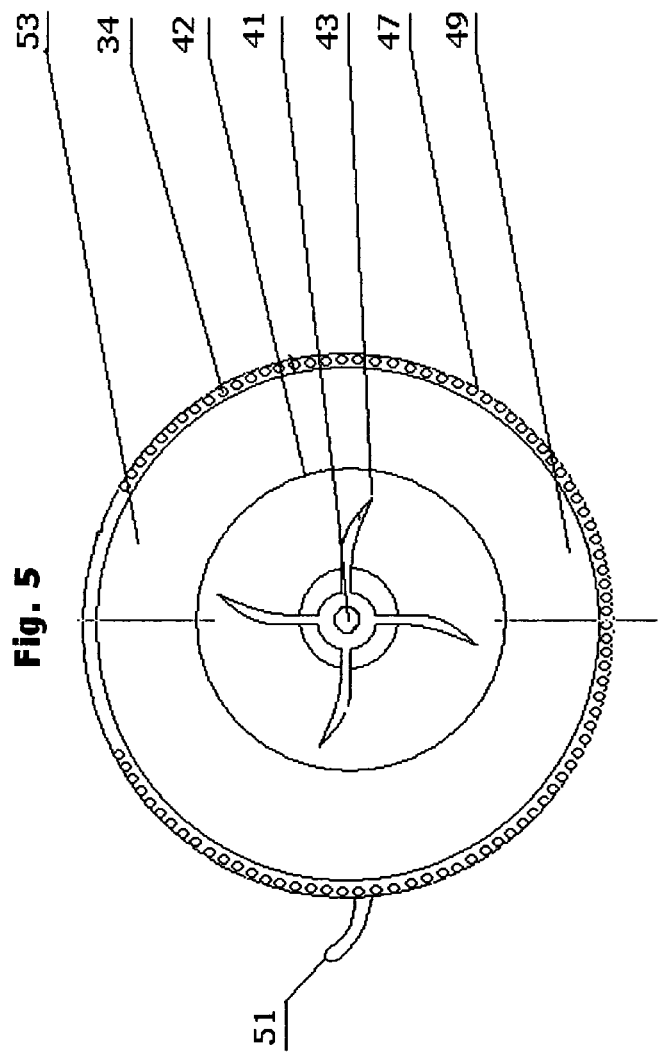

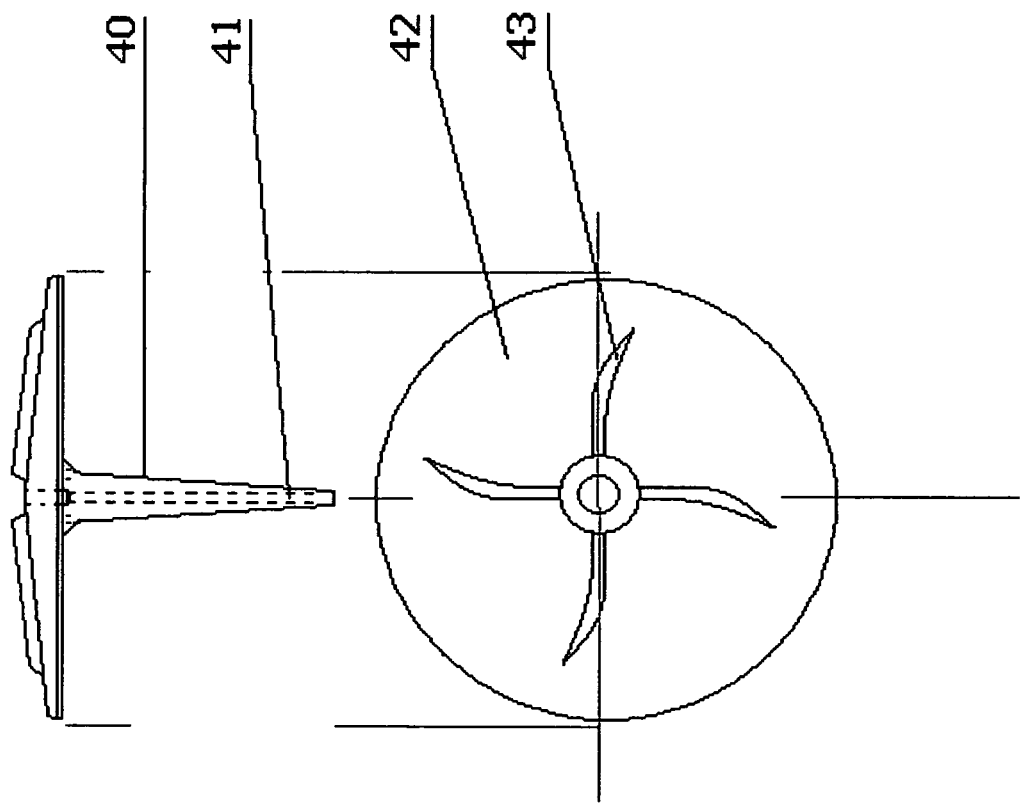

AUTOMATIC HYDROPONIC CLONING SYSTEM

RELATED APPLICATION

This application is a continuation of application Ser. No. 60/701,291 filed Jul. 21, 2005.

TECHNICAL FIELD

This invention relates to cloning systems, and, more particularly, automatic hydroponic cloning systems adapted to provide automated misting, irrigation and oxygenation by pressure of the cutting until a root system is established.

BACKGROUND OF THE INVENTION

Cloning is a form of plant propagation that has been around for a very long time. It's basically taking a growing portion of a plant—a stem with some leaves attached, and helping it to become a brand new plant that is genetically identical to the plant from which the clone was taken. This is often easy to do because plants often clone themselves in nature. It's called asexual reproduction. The methods currently used today include taking cuttings, layering, division, grafting, budding and tissue culture. Gardeners often trade cuttings and divisions as a way of sharing plants with their friends.

Experiments show that by starting the feeding immediately after the first roots emerge, immunization and seedling strength are increased and young plants experience minimal shock. In addition, experiments show that providing the growing chamber with a mixture of oxygen and solution under slight pressure, and at any selected temperature assists in proper growth of the cloned plants. By misting roots and cuttings, instead of spraying or irrigating, the water is broken down to nearly its molecular level, thereby carrying more oxygen with the solution to the cutting and making absorption easier and minimizing the risk of mold or rotting.

There are a number of devices conceived to assist growers, both home growers as well as commercial growers, to better automate and control sprouting seeds or cloning plants.

U.S. Pat. No. 6,442,892 entitled "Automatic Sprouter System" which issued on Sep. 3, 2002 to the present inventor, and is commonly owned by the applicant of the present application, provides a misting automatic sprouter system.

U.S. Pat. No. 4,144,671 entitled "Apparatus for Growing Bean Sprouts" which issued on May 20, 1979 to Lee discloses a self watering apparatus including a housing divided into an upper and a lower compartment by a horizontal divider plate having orifices therethrough. A tilting water container is used to periodically supply water to plants in the upper compartment.

U.S. Pat. No. 4,989,367 entitled "Method and Apparatus for Germinating Seed Sprouts" which issued on Feb. 5, 1991 to Chung discloses accelerated sprouting of bean sprouts by placing said sprouts in a closed vessel on a screen. The seeds are soaked with water and additives and humidified air is blown through at periodic intervals.

U.S. Pat. No. 5,025,589 entitled "Methods and Apparatus for Growing Bean Sprouts" which issued on Jun. 25, 1991 to Park discloses a series of vertical beds having bean sprouts growing therein organized in order of size with the largest at the top. Water cascades downward through the beds at periodic intervals.

However, there is still a need for an apparatus for use by the home owner or small commercial concern which is fully automatic until harvest with no human touch. In addition, the prior art teaches that water with some air circulation provides the best combination for cloning. However, new research indicates that maximizing the air with a minimum amount of water makes for better clones with a minimal risk of contamination by molds and the like. Further, some commercial units employ misting systems which generally involve forcing water through small pores. However, such misting systems do not mix air with the water but use water pressure to create mist via a nozzle system which does not introduce clean air from outside the growing compartment. This air that is trapped within the growing compartment can be contaminated with bacteria and recirculation increases the chances of contamination. In addition, the small pores plug after a period of use. Thus, there is a need to provide a cloning system which does not employ irrigating or misting with pores systems. The present invention meets these needs.

None of the known prior art disclose the device set forth herein.

SUMMARY OF THE INVENTION

It is an object of this invention to provide a simple, easy to use fully automated cloning apparatus to minimize handling and maximize hygiene.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 3 is a side cross sectional view of FIG. 2 taken along line 3-3;

FIG. 4 is a close up cross sectional view of FIG. 3 of the circled area 4;

FIG. 5 is a cross sectional view of FIG. 4 taken along line 5-5; and

FIG. 6 is a close up view of a tapered shaft and disk used for delivering pressurized mist enriched with oxygen.

DESCRIPTION OF THE PREFERRED EMBODIMENT

Figure 1:
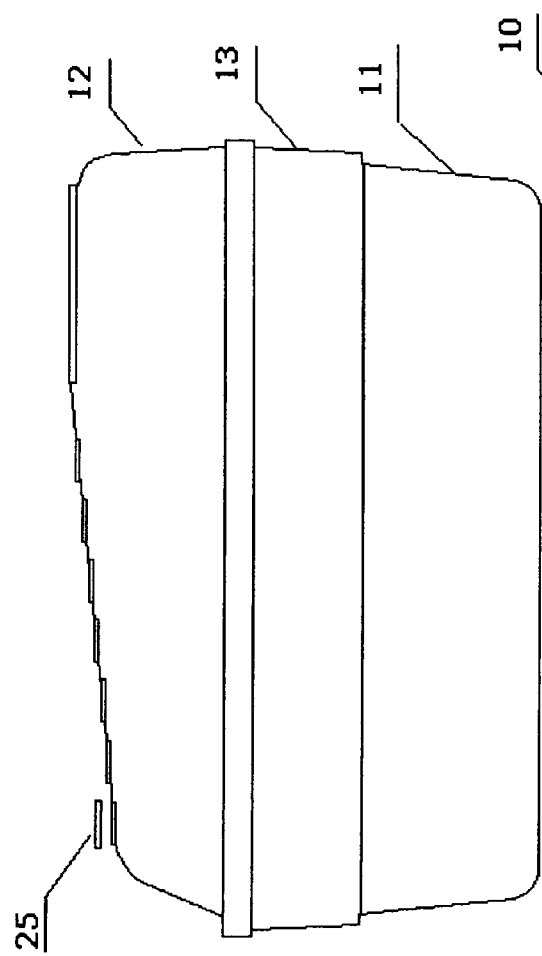
FIG. 1 is a top view of the present invention.
Figure 2:
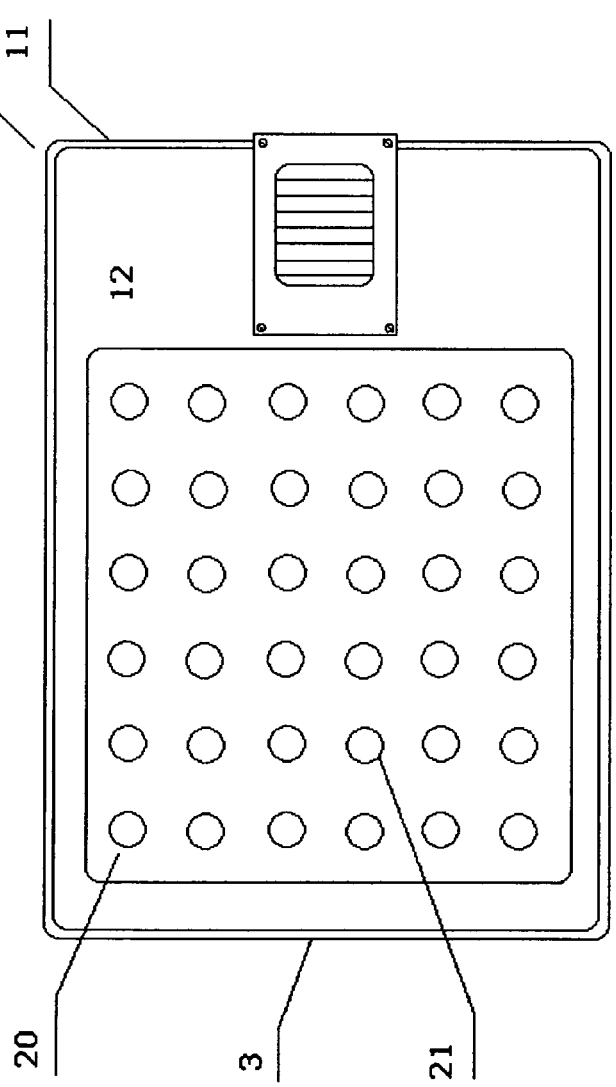
FIG. 2 is a side view of the present invention.

Referring more particularly to the drawings by characters of reference, FIGS. 1-5 disclose an automatic cloning apparatus 10 comprising a housing 11 having, preferably, a lid 12 mounted to a base 13. As best seen in FIG. 3, the interior of housing 11 is divided into a plant compartment 14 and a water compartment 16 by a divider wall 15. Divider wall 15 includes a drain 17 which provides liquid communication between plant compartment 14 and water compartment 16 thereby keeping the water levels even between compartments 14 and 16 and creating flow between said compartments without the need for pumps and the like. The circulation of water between compartments 14 and 16 is important in order to assure the solution remains well mixed. In the presently preferred embodiment, housing 11 is a generally box-like structure with water compartment 16 abutting a rear wall 18 thereof and extending into housing 11. The remaining portion of the interior of housing 11 comprises the larger plant compartment 14 which abuts water compartment 16.

Those skilled in the art will recognize that the exact shapes and sizes of housing 11, plant compartment 14 and water compartment 16 are matters of design choice.

Turning now to FIG. 4, the top of lid 12 includes a plurality of porous net pockets 20 extending through holes 21 in which cuttings or plants 23 rest. Holes 21 are covered with caps 25 if not in use. Use of net pockets 20 allows a user to simply lift said net pockets to move of plants from one apparatus 10 to another without having transplant shock.

Turning now to FIG. 5, water compartment 16 includes an upper hardware space 30 having a mist generator 36. Mist generator 36 includes a motor 38 which is mounted in a motor compartment 31 within the upper hardware space 30 and has a power shaft 39 extending downwardly there from. Best seen in FIG. 6, power shaft 39 is a hollow tapered shaft 40, open at both its upper and lower ends, which extends downwardly from motor 38 and into water 33. Shaft 40 is tapered from a wide portion at the top to a narrower portion below. When shaft 40 is spinning rapidly, the combination of centripetal force on the water and the outwardly sloping inner surface of tapered shaft 40 forces water upwardly therein as shown by arrows. The amount of water 33 lifted by shaft 40 is dependent upon the diameter and length of shaft 40 and the rotational speed thereof.

Mounted atop the open upper end of shaft 40 is a disk 42. The open upper end of shaft 40 directs water 33 onto disk 42 as shown by arrows 41. The spinning disk 42 includes radially oriented blades 43 create a low pressure area above disk 42 which pull fresh air from outside the device via suction through air filter 49, preferably a carbon filter, as shown by arrows 51. In the most preferred embodiment, this air suction acts to replace all of the air within the device every 70 seconds. Spinning disk 42 impels the water off said disk 42 in a radial movement of small droplets into mesh cage 47. These small droplets encounter mesh cage 47 which comprises a plurality of fins 34 mounted proximate to the periphery of an annulus 49. The incoming air 51 and water 41 are thoroughly mixed within mixing area 34 which is thereafter forced through mesh 47 to plant compartment 14 in a fine mist. The fineness of the mist particles is dependent upon the separation between fins 34 as well as the rotational speed of disk 42.

In addition, as best seen in FIGS. 4 and 5, mesh 47 is freely rotatable and includes a rudder 51 extending outwardly therefrom. The outward air flow encountering rudder 51 from rapidly spinning disk 42 causes mesh 47 to rotate slowly about the periphery of disk 42. Mesh 47 is preferably provided with an open area 53 having no fins 34 therein. When this area rotates to face plant compartment 14, a brief irrigation occurs until the fins 34 again face said plant compartment to resume the misting process. The brief irrigation allows more nutrient solution to reach the growing plants.

The action of mist generator 36 provides for an increase in air pressure within plant compartment 14 when operating. The pressurization acts to oxygenate water 33 and provides more air (oxygen) and water to the cloned plants, minimizing callus formation as well as encouraging nods to propagate. This also results in a coolant effect to the root area compensating for environmental temperature which may be above the ideal temperature for encouraging rooting. The excess air pressure bleeds out through porous net pockets 20. In addition, rotating shaft 40 itself creates constant ripples in the water 41 adding oxygen thereto.

Although only certain embodiments have been illustrated and described, it will be apparent to those skilled in the art that various changes and modifications may be made therein without departing from the spirit of the invention or from the scope of the appended claims. For example, large trays can be used to germinate seeds within apparatus 10 with subsequent movement to net pockets when sprouting. Also, apparatus 10 can be modularized whereby a single water compartment 14 can be shared between a number of plant compartments 16 sharing the same solution.

That which is claimed is:

1. An automatic cloning apparatus comprises a housing having a top, the housing having an interior divided into a plant compartment and a water compartment, the housing adapted to hold water in the interior thereof, the plant compartment and the water compartment being in liquid communication, the top over the plant compartment including a plurality of porous net pockets extending therethrough, each of the plurality of porous net pockets adapted to support cuttings and plants therein, the water compartment further including a mist generator adapted to provide a mist of water throughout the housing from water contained within the water compartment and from fresh air drawn by suction from outside the housing into the mist generator, the mist of water being a combination of the fresh air and water contained within the water compartment, the mist generator comprising a motor having a hollow tapered power shaft extending downwardly therefrom into the water, the hollow tapered power shaft having a wide portion at the top and a narrow portion at the bottom thereof whereby when the hollow tapered power shaft is rotating, the combination of centripetal force on the water in the hollow tapered power shaft and the outwardly sloping inner surface thereof forces water upwardly therein, a disk mounted atop the hollow tapered power shaft and extending laterally therefrom which receives water from the hollow tapered power shaft and directs the water laterally therefrom, the disk including one or more radially oriented blades which create a low pressure mixing area above the disk to thereby pull the fresh air via suction into the mixing area above the disk, the fresh air and the water mixing to provide the fine mist, the amount of water lifted by the hollow tapered power shaft being dependent upon the diameter and length of the hollow tapered power shaft and the rotational speed thereof, and a mesh cage surrounding the disk whereby water from the disk is forced therethrough in a fine mist.

2. The automatic cloning apparatus of claim 1 wherein the water compartment includes an upper hardware space, the mist generator being mounted in the upper hardware space.

3. The automatic cloning apparatus of claim 1 wherein the mesh cage comprises a plurality of fins mounted proximate to the periphery of an annulus mounted proximate to the edge of the disk.

4. The automatic cloning apparatus of claim 3 wherein the fineness of the mist is predetermined by the separation between each of the plurality of the fins and the rotational speed of the disk.

5. The automatic cloning apparatus of claim 3 wherein the mesh cage includes an open area with no fins therein whereby a brief irrigation of the plant compartment is provided when the open area faces the plant compartment.

6. The automatic cloning apparatus of claim 1 wherein the mesh cage is freely rotatable.

7. The automatic cloning apparatus of claim 6 wherein the mesh cage further includes a rudder extending outwardly therefrom, the fine mist encountering the rudder thereby causing the mesh cage to rotate.

8. The automatic cloning apparatus of claim 1 wherein the plant compartment is provided with trays to germinate seeds.

9. The automatic cloning apparatus of claim 1 having a plurality of water compartments.

10. The automatic cloning apparatus or claim 1 further comprising a divider wall separating the plant compartment and the water compartment.

11. The automatic cloning apparatus of claim 10 wherein the divider wall includes a drain positioned at the bottom thereof, the drain providing liquid communication between the plant compartment and the water compartment.

12. The automatic cloning apparatus of claim 1 wherein the top of the housing is a removable lid with a plurality of holes corresponding to the plurality of porous net pockets, the lid having a plurality of caps for covering those of the plurality of holes not in use.

13. The automatic cloning apparatus of claim 1 wherein the housing is a six-sided box structure with the water compartment abutting one wall thereof and the remaining portion of the housing being the plant compartment.

14. An automatic cloning apparatus comprises:
a housing having a lid, the housing having an interior divided into a plant compartment and a water compartment, the housing being a generally box-like structure with the water compartment abutting a rear wall thereof with the remaining portion of the housing being the plant compartment, the housing adapted to hold water in the interior thereof, the plant compartment and the water compartment being in liquid communication, the lid over the plant compartment including a plurality of porous net pockets extending therethrough, each of the plurality of porous net pockets adapted to support cuttings and plants therein, the water compartment further comprising an upper hardware space which includes a mist generator adapted to provide a mist of water throughout the housing from water contained within the water compartment and from fresh air drawn by suction from outside the housing into the mist generator, the mist of water being a combination of the fresh air and water contained within the water compartment, the mist generator comprising a motor having a hollow tapered power shaft extending downwardly therefrom into the water, the hollow tapered power shaft having a wide portion at the top and a narrow portion at the bottom thereof whereby when the hollow tapered power shaft is rotating, the combination of centripetal force on the water in the hollow tapered power shaft and the outwardly sloping inner surface thereof forces water upwardly therein, a disk mounted atop the hollow tapered power shaft and extending laterally therefrom which receives water from the hollow tapered power shaft and directs the water laterally therefrom, the amount of water lifted by the hollow tapered power shaft being dependent upon the diameter and length of the hollow tapered power shaft and the rotational speed thereof, the disk further including one or more radially oriented blades which create a low pressure mixing area above the disk to thereby pull the fresh air via suction into the mixing area above the disk, the fresh air and the water mixing to provide the fine mist; and a mesh cage surrounding the disk whereby water from the disk is forced therethrough in a fine mist.

15. The automatic cloning apparatus of claim 14 wherein the mesh cage comprises a plurality of fins mounted proximate to the periphery of an annulus mounted proximate to the edge of the disk, the fineness of the mist being predetermined by the separation between each of the plurality of the fins and the rotational speed of the disk, the mesh cage being freely rotatable, the mesh cage further including a rudder extending outwardly therefrom, the fine mist encountering the rudder thereby causing the mesh cage to rotate, the mesh cage including an open area with no fins therein whereby a brief irrigation of the plant compartment is provided when the open area faces the plant compartment.

16. The automatic cloning apparatus of claim 14 wherein the plant compartment is provided with large trays to germinate seeds.

17. The automatic cloning apparatus of claim 14 having a plurality of water compartments.

18. The automatic cloning apparatus or claim 14 further comprising a divider wall separating the plant compartment and the water compartment, the divider wall including a drain positioned at the bottom thereof, the drain providing liquid communication between the plant compartment and the water compartment.

* * * * *